United States Patent [19]

Minhinnick

[11] 4,039,215

[45] Aug. 2, 1977

[54] AUTO MOLDING WITH INTEGRALLY MOLDED CONNECTOR

[75] Inventor: James W. Minhinnick, Grand Rapids, Mich.

[73] Assignee: U.S. Industries, Inc., New York, N.Y.

[21] Appl. No.: 686,702

[22] Filed: May 17, 1976

[51] Int. Cl.² .................................... B60R 19/06
[52] U.S. Cl. .................... 293/71 R; 52/718; 293/62
[58] Field of Search .............. 293/60, 62, 63, 71 R, 293/96, 99, 1 R; 15/45; 52/716–718; 24/73 HS

[56] References Cited

U.S. PATENT DOCUMENTS

| | | | |
|---|---|---|---|
| 2,566,605 | 9/1951 | Ekornaas | 293/63 |
| 3,310,929 | 3/1967 | Garvey | 52/717 |
| 3,466,709 | 9/1969 | Brown | 52/718 |
| 3,550,217 | 12/1970 | Collyer | 24/73 HS |
| 3,897,967 | 8/1975 | Barenyi | 293/62 |

*Primary Examiner*—Trygve M. Blix
*Assistant Examiner*—Stuart M. Goldstein
*Attorney, Agent, or Firm*—Price, Heneveld, Huizenga & Cooper

[57] ABSTRACT

The specification disloses an automobile molding with an integral connector protruding from the inner surface of the molding. The connector has a central core opening and a transverse securing slot having a wall which cants away from the inner surface of the molding as the slot extends toward the central opening thereby facilitating removal of a core pin used in molding the connector and simplifying the mold and the molding operation.

8 Claims, 7 Drawing Figures

AUTO MOLDING WITH INTEGRALLY MOLDED CONNECTOR

BACKGROUND OF THE INVENTION

This invention relates to molding strips; and, more particularly, to an automobile molding for connection to an automobile. Typically, these moldings are mounted on the bumper.

One type of automobile molding used today has an elongated plastic strip containing a relatively flat, elongated internal metal flange which acts to anchor connecting studs extending from the metal flange through the plastic and sufficiently beyond the inner surface of the strip to be used as connectors. Such molding is relatively expensive because of the difficulty of aligning the metal flange within the elongated plastic so the flange does not protrude and the cost of the metal flange and attached connector.

Another type of automobile molding strip has an elongated plastic strip with an integral connector protruding from the strip. The connector has an elongated body terminating in a head, having a greater width than the body, and a tapering end section, which passes through a connecting opening in an automobile and securely holds the molding strip against the automobile. When injection molding is used to form such a piece of automobile molding, the fabrication of a connector body having a smaller diameter than the head requires the use of additional cams within a mold. Such cams must be supported within the mold during molding and result in a relatively complex mold with a relatively high cost of maintenance.

SUMMARY OF THE INVENTION

In the automobile molding of the present invention, integrally molded elongated connectors extend outward from the inner surface of the molding strip for coupling to openings in the automobile, each connector having a central core opening and a transverse securing slot extending through the connector to the central core opening for engaging the edge of an aperture in the automobile bumper or other components. The outer longitudinal wall of the slot cants outward away from the inner surface of the molding strip as the canted wall extends into the connector to the central core opening. This facilitates molding of the strip in a two-piece mold without cams, and also facilitates positive fastening in the bumper aperture. One half of the mold defines the outer surface of the molding strip and the second half defines the inner surface of the molding strip and the outer surface of the connector while core pin on the second half forms the central core opening and the transverse slot. The core pin has transverse protrusions, extending radially outward from an elongated body portion, to form the transverse slots with the canted walls. After molding, when the mold halves are separated, the molding strip can be easily stripped or ejected off the core pin because of the outer wall of the transverse slot cants in the direction of withdrawal of the core pin thereby allowing then to slide over the transverse protrusions of the core pin to easily pass.

DRAWINGS

DETAILED DESCRIPTION

Figure 1:
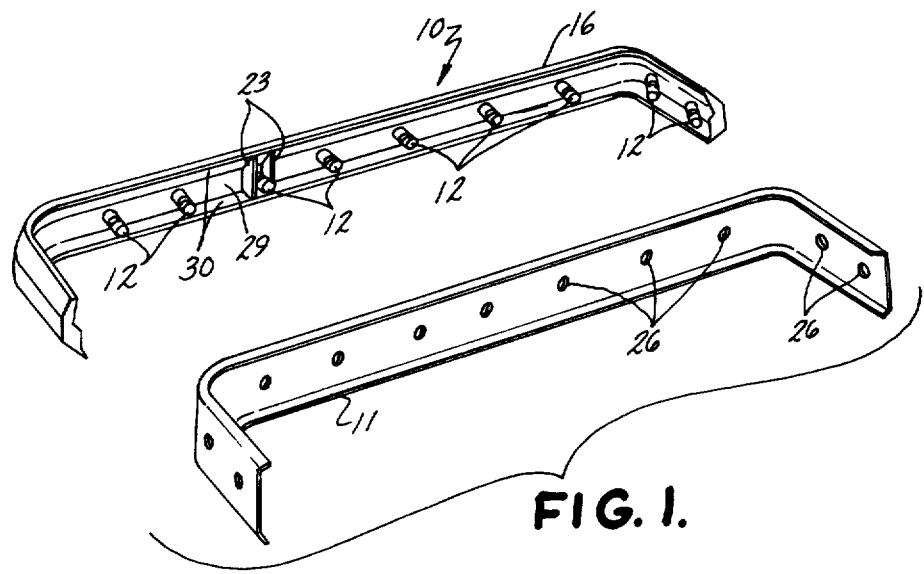
FIG. 1 is an exploded view of a bumper and an automobile molding in accordance with an embodiment of this invention.
Figure 2:
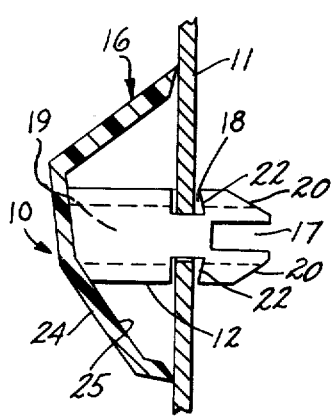
FIG. 2 is a transverse cross sectional view of molding strip of the present invention mounted on a bumper.

Referring to the drawings, an automobile molding 10 has an elongated body strip 16 with a generally convex outside surface 24 and a generally concave inner surface 25 (FIGS. 1 and 2). More particularly, outside surface 24 includes an elongated, longitudinal flat central portion 27 and two elongated, longitudinal, flat flanges 28 extending, transversely, at an angle, from the two longitudinal edges of flat central portion 27 whose shapes are primarily determined by ornamental appearance considerations. Similarly, inner surface 25 has a flat central portion 29 bounded in a transverse direction by two flanges 30. Elongated, generally cylindrical connectors 12 extend outwardly from central portion 29 of inner surface 25 of molding strip 16 and pass through and engage connecting holes 26 in a bumper 11 as shown in FIG. 1. Connectors 12 can be perpendicular to the central portion of inner surface 25 or displaced from the perpendicular, depending upon the relative direction of movement to connect auto molding 10 to bumper 11. In FIG. 1, connectors 12 near the extremities of auto molding 10 are displaced from the perpendicular and connectors 12 located intermediate the extremities of auto molding 10 are substantially perpendicular.

Figure 3:
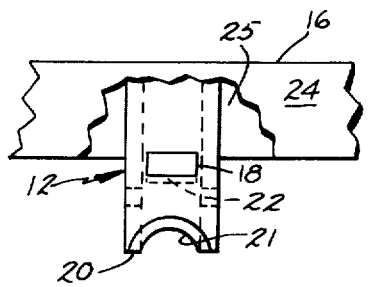
FIG. 3 is a partially broken away plan view of an automobile molding in accordance with an embodiment of this invention.
Figure 4:
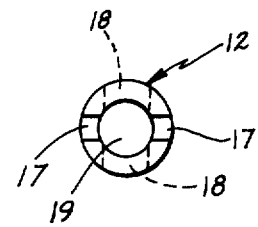
FIG. 4 is an end view of the connector portion of the molding in accordance with an embodiment of this invention.

Connector 12 has a generally cylindrical central core opening 19 extending longitudinally from the connected end of connector 12 at inner surface 25 of molding strip 16 to the front end of connector 12 which passes through connecting hole 26 in bumper 11 (FIGS. 2-4). Connector 12 has a pair of transverse slots 18 radially opposed to each other and circumferentially spaced so sufficient material of connector 12 remains between transverse slots 16 to support auto molding 10 when connected to bumper 11. In this embodiment, the longitudinal length of transverse slots 18 (i.e., in a transverse direction with respect to connector 12) is approximately equal to the diameter of central core opening 19. Transverse slots 18 extend radially from the outer wall of connector 12 through connector 12 to central core opening 19. A longitudinal wall 22 of slot 18 farthest from inner surface 25 of molding strip 16 is canted toward the front end of connector 12 as wall 22 extends into connector 12 toward central core opening 19. As will be discussed later, this is particularly significant to facilitate removal of a portion of the mold forming connector 12 and to simplify the molding process. Transverse slots 18 engage bumper 11 when connector 12 is pushed through hole 26 in bumper 11. It is also significant that canted wall 22, which provides for easy withdrawal of a portion of the mold, now acts to prevent withdrawal of connector 12 from bumper 11.

Figure 7:
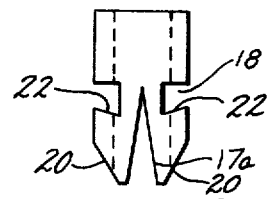
FIG. 7 is a side elevational view of an alternative embodiment connector having a generally V-shaped longitudinal slot.

Connector 12 also includes a pair of radially opposed, circumferentially spaced longitudinal slots 17 extending from the front end of connector 12 toward inner surface 25 of molding strip 16 (FIG. 4, with alternative embodiment shown in FIG. 7 as 17a). In this embodiment, longitudinal slots 17 extend to about the forward most extremity of canted wall 22 and do not extend into the portion of connector 12 between transverse slots 18. Longitudinal slots 17 have straight sides parallel to the longitudinal axis of connector 12 and straight bottom ends perpendicular to the sides. Advantageously, the circumferential location of longitudinal slots 17 is between the longitudinal extremities of adjacent transverse slots 18. When a portion of the mold is being removed from central core opening 19 of connector 12, longitudinal slots 17 provide a relief so the front end of connector 12 can spread apart permitting the portion of the mold to be removed easily. It is also significant that longitudinal slots 17 provide relief for compressively deforming the front end of connector 12 thereby facilitating insertion of connector 12 into connecting hole 26 of bumper 11. Accordingly, longitudinal slots 17 take up a relatively small portion of the circumference of connector 12, but are sufficiently wide to permit deformation of connector 12 during mounting of auto molding 10. In this embodiment, longitudinal slots 17 have approximately the same width as transverse slots 18.

Each semi-circular portion of the front end of connector 12 bounded by longitudinal slots 17 has a front tapered surface 20 to facilitate insertion of connector 12 into connecting hole 26 of bumper 11 (FIGS. 2 and 3). Front tapered surface 20 is semi-circular and defined by the intersection of an inclined plane with the cylindrical wall of connector 12. In this embodiment, front tapered surface 20 begins tapering at a location forward of and spaced from canted wall 22, and has a smaller angle with respect to the longitudinal axis of connector 12 than does canted wall 22. The front edge of tapered surface 20 defines an arcuate relief 21 which is another means for permitting deformation of the front end of connector 12 thereby facilitating insertion of connector 12 into connecting holes 26 of bumper 11. That is, the extremities of the front end of connector 12 adjacent longitudinal slots 17 can be bent toward each other.

Figure 5:
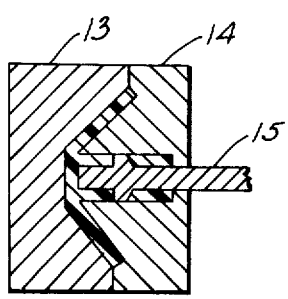
FIG. 5 is a cross sectional view of a mold for forming an automobile molding strip in accordance with an embodiment of this invention.
Figure 6:
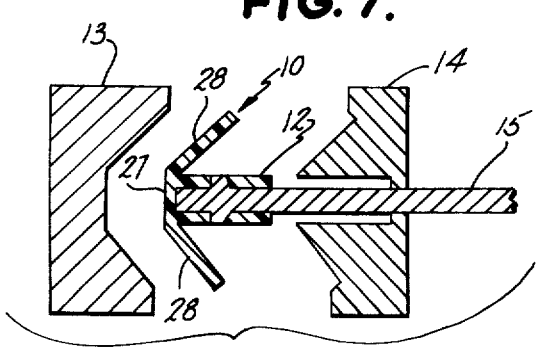
FIG. 6 is an exploded view of a mold and an automobile molding strip in accordance with an embodiment of this invention.

Referring to FIGS. 5 and 6, a female mold half 13 defines convex outside surface 24 of molding strip 16 and male mold half 14 defines concave inner surface 25 of molding strip 16 and the exterior of connector 12. A core pin 15 extends through an opening in inner mold 14 and defines the interior of connector 12 including central core opening 19, transverse slots 18 and longitudinal slots 17. Accordingly, core pin 15 has a cylindrical body with longitudinal and transverse protrusions. Examples of typical plastics includes Surlyn and other types of polyolefins.

FIG. 6 shows the disassembly of the mold after molding. Female mold 13 and male mold 14 separate from auto molding 10 along a path parallel to the longitudinal axis of connector 12. Core pin 15 moves outwardly from male mold 14 to separate connector 12 therefrom. Because canted wall 22 promotes withdrawal and longitudinal slots 17 permit the front end of connector 12 to separate thereby permitting the passage of the transverse protrusions of core pin 15 which were used to mold transverse slots 18, molding 10 can be readily stripped off core pins 15, or core pins 15 can include internal ejector pins which can eject molding 10 from core pin 15.

Referring to FIG. 7, an alternative embodiment of connector 12 includes longitudinal slots 17a having a V-shape instead of having a bottom wall perpendicular to the side walls. The V-shape permits complete seperation of a V-shaped longitudinal protrusion of core pin 15 from the wall of longitudinal slot 17a upon a small longitudinal motion of core pin 15, and facilitates easy removal of core pin 15. As in the previous embodiment, the V-shape permits flexing of the front end of connector 12 both for inserting connector 12 in connecting hole 26 in bumper 11.

Various modifications will no doubt occur to those skilled in the art to which this invention pertains. For example, the shape of the outer and inner surfaces of the molding strip may be varied from that disclosed herein. These and all other variations which basically rely on the teachings by which this disclosure has advanced the art are properly considered within the scope of this invention.

The embodiments of the invention in which an exclusive property or privilege is claimed are defined as follows:

1. An automobile molding comprising:
   an elongated molded plastic strip having an outer surface for facing away from an automobile and an inner surface for facing toward an automobile; and
   at least one elongated molded plastic connector extending outward from said inner surface to an outward extremity spaced away from said inner surface for coupling said automobile molding to the automobile, said connector having a longitudinal central core opening extending from said extremity inwardly into said connector towards said inner surface of said strip, generally along the longitudinal axis of said connector, and a transverse slot extending along at least one side of said connector transverse to its longitudinal axis and defining an oppening from the exterior of said connector into said central core opening, said transverse slot including an inner edge wall located towards said inner surface of said strip and an outer edge wall spaced from said inner edge wall in a direction away from said inner surface of said strip, said outer edge wall of said transverse slot being a canted wall, said canted wall canting outward with respect to said inner surface of said strip as said canted wall extends from the exterior of said connector into said central core opening, thereby facilitating removal of a single piece mold portion, for forming said central core opening and said transverse slot, from said central core opening and said transverse slot and facilitating engagement of said connector to the automobile.

2. An automobile molding as recited in claim 1 wherein said connector includes a longitudinal slot extending longitudinally from said outward extremity of said connector toward said inner surface, for decreasing the resistance of said connector to transverse deformation thereby facilitating removal of a mold portion from said transverse slot and insertion of said connector in a connection hole in the automobile.

3. An automobile molding as recited in claim 2 wherein said connector includes a front tapered surface at said outward extremity of said connector, said front tapered surface tapering outward in a direction away from said outward extremity to reduce the transverse dimension of said connector at said outward extremity in relation to the transverse dimension of said connector at said canted outer edge wall of said transverse slot.

4. An automobile molding as recited in claim 3 wherein said molding strip and said connector are an integral single unit formed by injection molding.

5. An automobile molding as recited in claim 4 wherein said connector has a generally cylindrical shape with said central core opening being generally cylindrical, there being a second one of said transverse slots radially opposed to the other of said transverse slots and each said transverse slot extending partially around the circumference of said connector, there being a second one of said longitudinal slots radially opposed to the other of said longitudinal slots, each longitudinal slot circumferentially located between the lateral extremities of said circumferentially spaced transverse slots, and there being two of said front tapered surfaces, each being located along the intersection of an inclined plane with a portion of said cylindrical connector between said longitudinal slots.

6. An automobile molding as recited in claim 5 wherein the material of said automobile molding is polyolefin.

7. An automobile molding as recited in claim 6 wherein said longitudinal slots have a V-shape.

8. An integral, single piece automobile molding formed by injection molding comprising:
an elongated molding strip having an outer surface for facing away from an automobile and an inner surface for facing toward an automobile;
an elongated, cylindrical connector extending outward from said inner surface to an outer extremity for coupling said automobile molding to the automobile, said connector having a longitudinal, cylindrical, central core opening, a pair of circumferentially spaced, transverse slots radially opposed to one another, extending partially around the circumference of said connector from one lateral extremity to another and each having an inner edge wall spaced towards said inner surface of said strip and an outer canted edge wall spaced away from said inner edge wall and said inner surface of said strip, said canted walls canting outward with respect to said inner surface of said strip as said canted walls extend from the exterior of said connector into said central core opening, a pair of radially opposed longitudinal slots, extending longitudinally from said outward extremity of said connector toward said inner surface, each longitudinal slot circumferentially located between said lateral extremities of said circumferentially spaced transverse slots, and a pair of front tapered surfaces at the outward extremity of said connector, said tapered surfaces tapering outward in a direction away from said outward extremity towards said inner surface of said strip to reduce the transverse dimension of said connector at said canted wall, each tapered surface being defined by the intersection of an inclined plane with a portion of said cylindrical connector between said longitudinal slots.

* * * * *